(12) United States Patent
Kikuiri

(10) Patent No.: US 6,271,990 B2
(45) Date of Patent: *Aug. 7, 2001

(54) MAGNETIC RECORDING APPARATUS HAVING A MAGNETIC HEAD FOR CARRYING OUT AN OVERWRITE OPERATION

(75) Inventor: Katsuya Kikuiri, Nigata-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,088

(22) Filed: Mar. 8, 1999

(30) Foreign Application Priority Data

Mar. 11, 1998 (JP) .................................................. 10-060048

(51) Int. Cl.$^7$ ................................ G11B 5/187; G11B 5/23
(52) U.S. Cl. ........................................... 360/119; 122/125
(58) Field of Search ................................... 360/119, 125, 360/84, 122

(56) References Cited

U.S. PATENT DOCUMENTS

| | | | |
|---|---|---|---|
| 4,408,240 | * 10/1983 | Pastore | 360/121 |
| 4,772,967 | * 9/1988 | Okuda et al. | 360/84 |
| 5,023,731 | 6/1991 | Morisaki | 360/64 |
| 5,289,330 | 2/1994 | Wade | 360/122 |

FOREIGN PATENT DOCUMENTS 64-62808 * 3/1989 (JP).

* cited by examiner

*Primary Examiner*—Jefferson Evans
(74) *Attorney, Agent, or Firm*—Brinks Hofer Gilson & Lione

(57) ABSTRACT

In the sliding surface of a magnetic head to a magnetic tape, the center of a magnetic gap G is offset to the center CL of a core width so that the overwrite edge Ga of the magnetic gap G approaches the center CL of the core width. As a result, the data track left to a magnetic tape by overwrite is recorded with the portion of a magnetic head which is located at the center of cores and in good touch with the magnetic tape, whereby the recorded pattern of the data track is stable and the variation of a reproduced output can be suppressed.

4 Claims, 5 Drawing Sheets

FIG. 1A
FIG. 1B
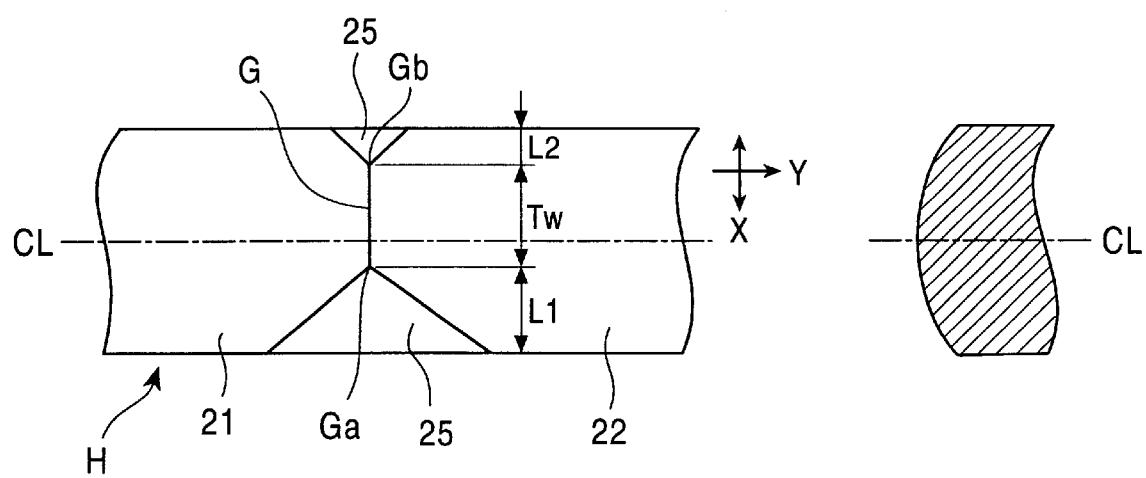
FIG. 2
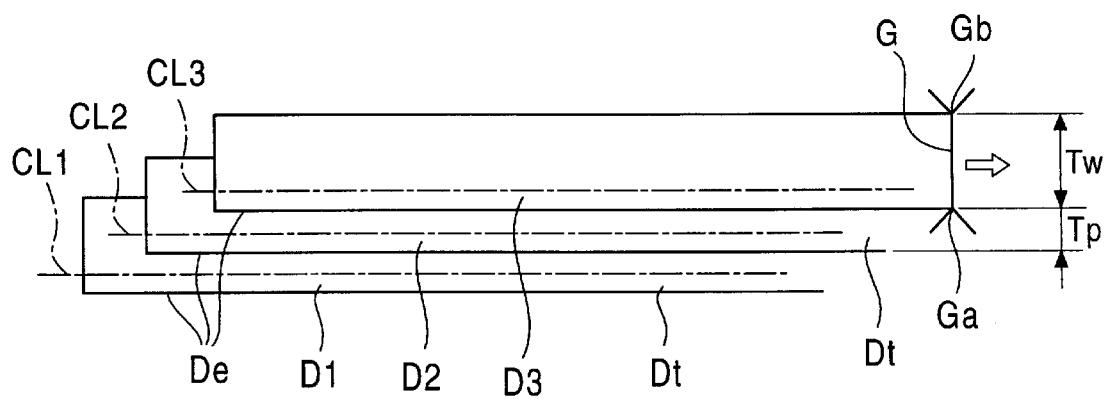

MAGNETIC RECORDING APPARATUS HAVING A MAGNETIC HEAD FOR CARRYING OUT AN OVERWRITE OPERATION

BACKGROUND OF THE INVENTION

1. Field of the Invention

The present invention relates to a magnetic recording apparatus for overwriting data on a magnetic recording medium with, for example, a magnetic head mounted on a rotary drum, and more specifically, to a magnetic recording apparatus for stabilizing the recorded state of tracks to which data is overwritten.

2. Description of the Related Art

In magnetic recording apparatuses used in video equipment and magnetic recording apparatuses for writing data for computers, a magnetic head is mounted on the rotary drum of a rotary head unit, and a magnetic tape travels in helical contact with the rotary drum as well as the rotary drum rotates so that a recording operation is carried out to the magnetic tape in a helical scan system.

Among this type of the magnetic recording apparatuses, there is a magnetic recording apparatus which uses a magnetic head having a magnetic gap whose track width Tw is larger than the pitch Tp of tracks recorded on a magnetic tape and overwrites data to the magnetic tape by scanning the magnetic head so that the magnetic gap overwrites the track of the magnetic tape where data is already written.

FIG. 5 is a plan view showing the tape sliding surface of the magnetic head mounted on the rotary drum of the magnetic recording apparatus in an enlarged fashion.

A magnetic gap G is formed to a portion of the tape sliding surface of the magnetic head where cores 1 and 2, which are formed of a magnetic material having a high magnetic permeability, are jointed in confrontation with each other through a non-magnetic material layer. Although the magnetic gap G has an azimuth angle which is inclined by a minute angle with respect to a direction (X-direction) orthogonal to a scanning direction Y, the magnetic gap G is shown at a right angle with respect to the scanning direction Y in this specification.

Symbol Tw denotes the track width of the magnetic gap G. The track width Tw is determined by the depth of core regulating grooves 3, 3 formed to a V-shape on both the right and left sides of the cores 1, 2 at the portion where they are jointed to each other. In a magnetic gap G which is actually formed with an azimuth angle, the track width Tw means the size between both the edges G1–G2 of the inclined magnetic gap G in the track width direction (X-direction). Further, when the distance between the overwrite edge G1 of the magnetic gap G and the side edges of the cores 1, 2 is denoted by symbol L1 and the distance between the other edge G2 and the side edges of the cores 1, 2 is denoted by symbol L2, L1=L2 is established in the magnetic head used in the conventional magnetic recording apparatus and the center of the track width Tw of the magnetic gap G matches the center CL of the cores 1, 2 in the width direction thereof.

SUMMARY OF THE INVENTION

When data is recorded by overwrite using the conventional magnetic head, a recorded pattern is made unstable on the track where data is recorded on a magnetic tape, and, in particular, data recorded by the portion of the overwrite edge G1 of the magnetic gap G is made unstable. As a result, when overwritten magnetic information is reproduced, there arises problems such as a reproduced output is varied, and the like.

In particular, the pitch of tracks recorded on a magnetic tape is recently made narrower to realize recording of a high density in correspondence to the transfer of recorded data in a high density, and there is proposed a recording format having a track pitch of about 10 $\mu$m or less. In the magnetic recording made using such a narrow track pitch, unstable recording of data in the overwrite edge G1 has a significant effect as the variation of a reproduced output.

Reasons why the unstable recording is caused are as described below.

Although the tape sliding surface of the magnetic head shown in FIG. 5 is formed to a curved shape in the scanning direction (Y-direction), it is also formed to a curved shape in the track width direction (X-direction). This is caused by that when the tape sliding surface is polished in the scanning direction (Y-direction), it is also formed to the curved shape in the X-direction at the same time. Then, the apex of the curved surface in the X-direction approximately matches the center CL of the cores 1, 2 in the width direction thereof.

Since the center of the track width Tw of the magnetic gap G approximately matches the center CL of the cores 1, 2 in the width direction thereof, the overwrite edge G1 of the magnetic gap G is located at a position apart from the center CL so that the overwrite edge G1 is located at a position which retreats in a direction where it is somewhat apart from the tape with respect to the apex of the curved surface at the center CL. As a result, the portion of the overwrite edge G1 unstably touches the magnetic tape, whereby the recorded pattern is made unstable and the reproduced output is varied.

FIG. 6 shows the state that magnetic data is overwritten to the magnetic tape with the magnetic head shown in FIG. 5.

In FIG. 6, symbol D1 denotes data initially recorded on the magnetic tape which is scanned with the magnetic gap G and a center CL in the core width direction at the time is denoted by symbol CL1. Next, symbol D2 denotes magnetic data recorded on the magnetic tape which is scanned with the magnetic gap G while partially overlapping the magnetic gap G to the data D1 in a track width direction. The pitch Tp of a data track Dt which is left by overwrite is determined by the position of the overwrite edge G1 of the magnetic gap G.

As shown in FIG. 6, the data track Dt which is left from the initially recorded magnetic data D1 is data recorded at a portion of the magnetic head which is greatly apart from the center CL of the tape sliding surface of the magnetic head in the core width direction thereof. That is, the data which is recorded at the portion of the magnetic head where the magnetic gap touches the magnetic tape in a bad state is left as the data track Dt. In particular, a data boundary De in overwrite is recorded with the edge G1 of the magnetic gap G which is greatly apart from the center CL of the tape sliding surface in the core width direction thereof, data is liable to be unstably recorded at the boundary De.

An object of the present invention for solving the above conventional problem is to provide a magnetic recording apparatus capable of suppressing the great variation of a reproduced output by stabilizing the recorded pattern of a data track left to a recording medium by overwrite.

A magnetic recording apparatus of the present invention for carrying out an overwrite operation so that a magnetic gap having a prescribed track width overlaps the recording track having been recorded on the magnetic recording medium in the track width direction thereof by scanning a magnetic recording medium with a magnetic head to which the magnetic gap is formed at the portion thereof where cores composed of a magnetic material are confronted with each other is characterized in that the magnetic gap is formed by being offset with respect to the core width in the magnetic head so that the overwrite edge of the magnetic gap is offset to the center of the core width.

The magnetic recording apparatus of the present invention is arranged such that a magnetic head is mounted on the rotary drum of a rotary head unit, a magnetic tape travels in helical contact with the rotary head unit, the rotary drum is rotated and the magnetic tape is helically scanned with the magnetic head. Otherwise, the magnetic recording apparatus is such that a magnetic head may scan a magnetic tape in a plane fashion and overwrite may be carried out at the time or overwrite may be carried out when a disc-shaped magnetic recording medium is scanned with a magnetic head.

More specifically, according to the present invention, it is preferable that Tw−Tp=L1−L2 (however, L1>L2) is established, where Tw represents the track width of the magnetic gap, L1 represents the distance between the overwrite edge of the magnetic gap and the side edges of the cores, L2 represents the distance between the edge of the magnetic gap opposite to the overwrite edge and the side edges of the cores, and Tp represents the track pitch of a data track left to the magnetic recording medium by being overwritten.

In particular, the present invention is effective when the sliding surface of the cores to the recording medium is formed to a curved shape so that the center (CL) in the core width becomes an apex.

In the present invention, since the magnetic gap is formed by being offset with respect to the core width in the magnetic head so that the overwrite edge of the magnetic gap is offset to the center of the core width, the overwrite edge can be located at the portion of the sliding surface of the magnetic head which is in good touch with the recording medium. As a result, since the data track left to the magnetic recording medium by overwrite is recorded with the portion of the magnetic head which is in good touch with the magnetic recording medium, a recorded pattern is stable, and, as a result, a reproduced output is not greatly varied.

BRIEF DESCRIPTION OF THE DRAWINGS

FIG. 1A is an enlarged plan view showing the tape sliding surface of a magnetic head used to a magnetic recording apparatus of the present invention and FIG. 1B is a sectional view of the tape sliding surface;

FIG. 2 is a plan view showing the overwritten pattern of a magnetic tape in the magnetic recording apparatus of the present invention;

DESCRIPTION OF THE PREFERRED EMBODIMENT

Figure 3:
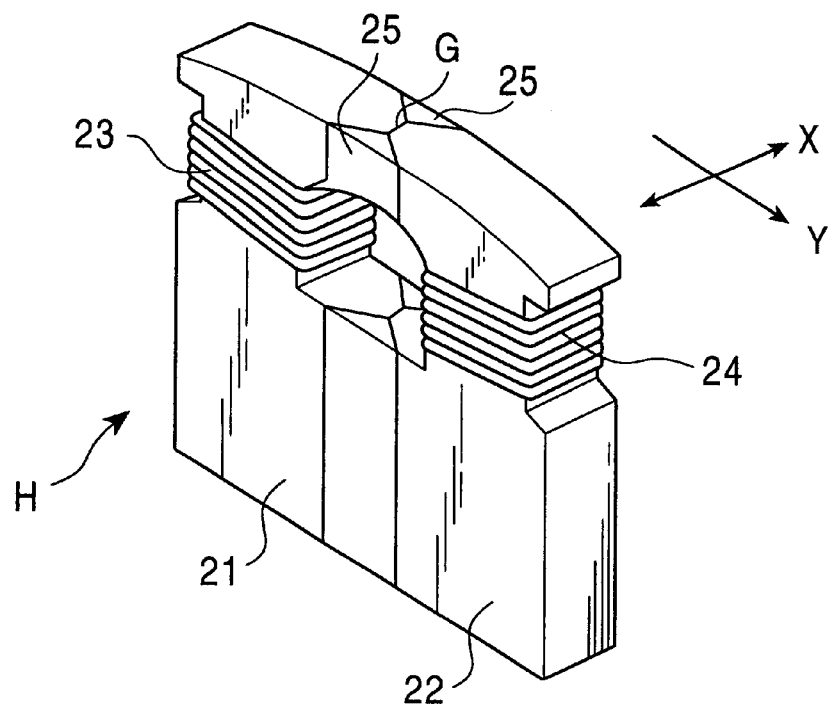
FIG. 3 is a perspective view of the magnetic head.
Figure 4:
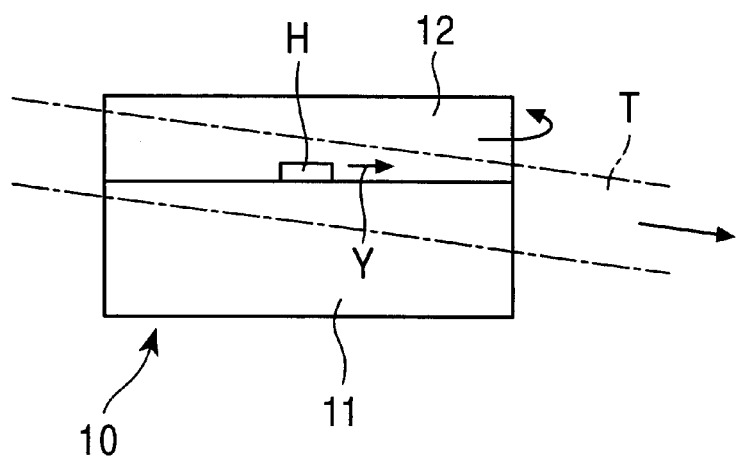
FIG. 4 is a front elevational view showing the rotary head unit of the magnetic recording apparatus of the present invention.
Figure 5:
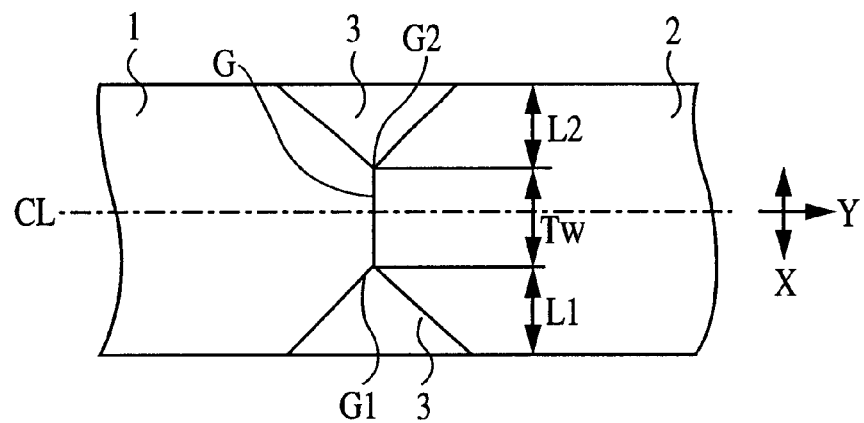
FIG. 5 is an enlarged plan view showing the tape sliding surface of a conventional magnetic head.
Figure 6:
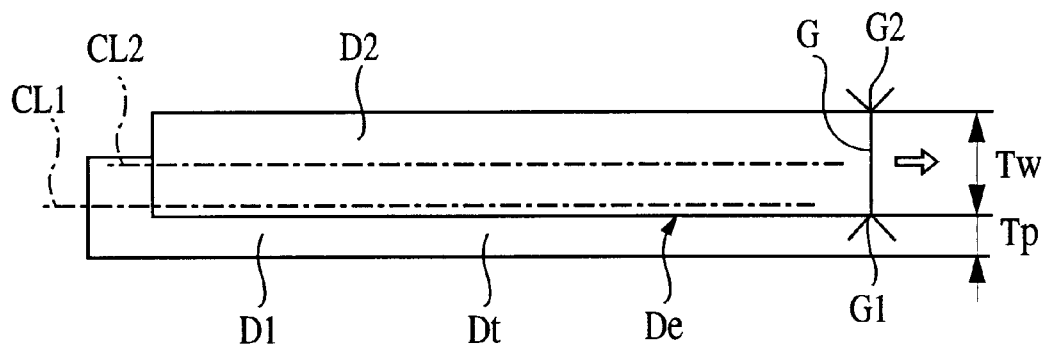
FIG. 6 is a plan view showing an overwritten pattern recorded with the magnetic head shown in FIG. 5.

FIG. 1A is an enlarged plan view showing the tape sliding surface of a magnetic head, FIG. 1B is a sectional view of the sliding surface of the magnetic head, FIG. 2 is an explanatory view explaining an overwrite operation executed using the magnetic head, FIG. 3 is a perspective view showing an example of the magnetic head, and FIG. 4 is a front elevational view showing the rotary head unit of a magnetic recording apparatus on which the magnetic head is mounted.

A fixed drum 11A is fixed in a rotary head unit 10 disposed to the magnetic recording apparatus shown in FIG. 4, and a rotary drum 12 which is coaxial with the fixed drum 11 is rotatably supported on the fixed drum 11 and rotated in the direction of an arrow by a motor. A magnetic tape T as a magnetic recording medium travels while drawing a helical locus in the direction of the arrow by being wound around the rotary head unit 10 at a prescribed angle. While the magnetic tape T travels, the rotary drum 12 is rotated and a magnetic head H mounted on the rotary drum 12 scans the magnetic tape T so that overwrite is carried out to the magnetic tape T as shown in FIG. 2.

As shown in FIG. 3, the magnetic head H has cores 21, 22 formed of a magnetic material having a high magnetic permeability such as ferrite or the like.

On the sliding surface of the magnetic head H on which the magnetic tape T slides, a magnetic gap G is formed to a portion of the sliding surface where the core 21 confronts the core 22 with a magnetic material layer interposed therebetween. Recording/reproducing coils 23, 24 are wound around the cores 21, 22. Further, V-shaped gap regulating grooves 25, 26 are formed to the cores 21, 22 on both the sides thereof on the sliding surface so as to define the track width Tw of the magnetic gap G. The gap regulating grooves 25, 26 are filled with a wear resistant non-magnetic material, for example, $SiO_2$.

FIG. 1A shows the track width of the magnetic gap G is denoted by the symbol Tw. Although the magnetic gap G usually has an azimuth angle which is inclined by a minute angle with respect to an X-direction orthogonal to the sliding direction (Y-direction) of the magnetic tape T, the azimuth angle is set to zero in FIG. 1A. When the magnetic gap G has an azimuth angle, the track width Tw is the distance between the edges Ga, Ga of the magnetic gap G in the core width direction (X-direction) thereof.

As shown in FIG. 1A, the center of the magnetic gap G in the track width Tw direction thereof is formed by being offset to the center CL of the cores 21, 22 in the width direction thereof so that the overwrite edge Ga of the magnetic gap G is offset to the above center CL on the sliding surface of the magnetic head H.

As shown in FIG. 3, although the sliding surface of the magnetic head H is polished to an approximately cylindrically curved shape in the scanning direction (Y-direction), it is formed to an approximately cylindrically curved shape also in the X-direction by the polishing job as shown in FIG. 1B. Then, the apex of the curved surface in the X-direction approximately matches the center CL in the core width direction.

Since the magnetic gap G is formed at the offset position as described above, the overwrite edge Ga of the magnetic gap G is located at a portion which is near to the apex on the curved shape in the X-direction.

The distance between the overwrite edge Ga of the magnetic gap G and the side edges of the cores 21, 22 is denoted by symbol L1 and the distance between the other overwrite edge Gb of the magnetic gap G and the side edges is denoted by symbol L2. Further, when the track pitch of a data track Dt which is left to the magnetic tape T as a result of the overwrite shown in FIG. 2 is denoted by a symbol Tp, Tw−Tp=L1−L2 (however, L1>L2) can be established.

A recording operation using the magnetic recording apparatus will be described.

As shown in FIG. 4, the magnetic tape T as the magnetic recording medium travels in the direction of the arrow by being wound around the rotary head unit 10 and the rotation of the rotary drum 12 permits the magnetic head H to scan the recording surface of the magnetic tape T to draw a helical locus. As shown in FIG. 2, magnetic data D1, D2, D3 . . . are sequentially overwritten on the recording surface of the magnetic tape T by the feed speed of the magnetic tape T and the scanning performed by the magnetic head H.

Although the respective magnetic data D1, D2, D3 . . . are recorded with a width corresponding to the track width Tw of the magnetic gap G of the magnetic head H, when other data is overwritten on them, the region located between the recorded portions of the overwrite edges Ga of the magnetic gap G are left to the magnetic tape T as the data track Dt.

As shown in FIG. 1A and FIG. 1B, since the overwrite edge Ga is offset to the center CL of the cores 21, 22 in the width direction thereof on the sliding surface of the magnetic head H, the portion to which magnetic recording is carried out in the region (or region near to the above region) which includes the center CL (the apex on the curve in the X-direction) on the sliding surface of the magnetic head H is left as the data track Dt. In FIG. 2, the centers in the core width direction corresponding to the magnetic data D1, D2, D3 ... are denoted by symbols CL1, CL2, CL3, . . . . As shown in FIG. 2, the center CL in the core width direction is located at an approximately mid portion of the data track Dt written at the track pitch Pt.

As described above, since there is left, as the data track Dt, a magnetically recorded region where data is recorded in the state that the magnetic tape is in good touch with the sliding surface of the magnetic head, the magnetically recorded pattern in the region left as the data track Dt is stabilized, and, in particular, the data boundary De of the data track Dt written at the edge Ga is stabilized. Accordingly, when the data is reproduced by the magnetic head, the variation of the reproduction output of the data is reduced.

Magnetic data was recorded on an 8 mm VTR magnetic tape T using a magnetic recording apparatus on which an 8 mm VTR magnetic head H was mounted. The track width Tw of the magnetic head H was set to 20 μm and the pitch Tp of a data rack was set to 5 μm. The traveling speed of the magnetic tape T was set to 3.8 m/sec and the frequency of a recording signal was set to 10 MHz.

In an embodiment, a core width (Tw+L1+L2) was set to 55 μm, L1 was set to 25 μm and L2 was set to 10 μm. In a comparative example, a core width was 55 μm, L1=L2, and L1 and L2 were set to 17.5 μm, respectively.

Figure 7A:
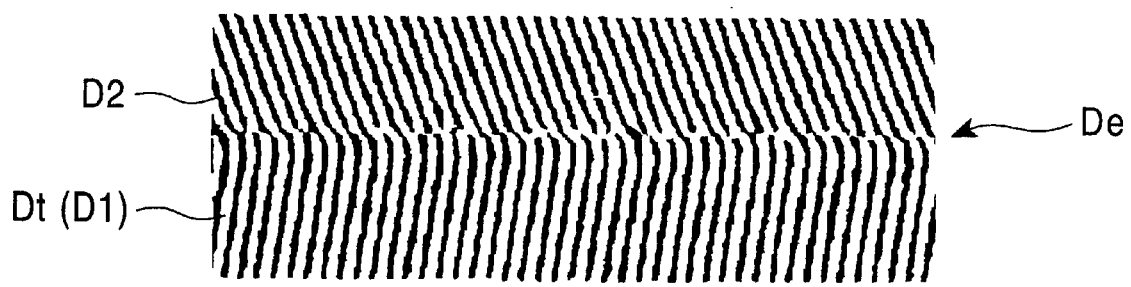
FIG. 7A is a view explaining a data track recorded on a magnetic tape in an embodiment when it is observed with an MFM and FIG. 7B is a view explaining a data track recorded on a magnetic tape in a comparative example when it is observed with the MFM.
Figure 7B:
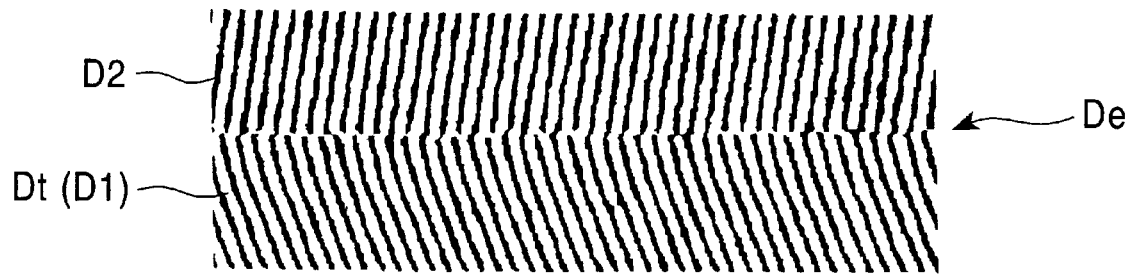
Figure 8A:
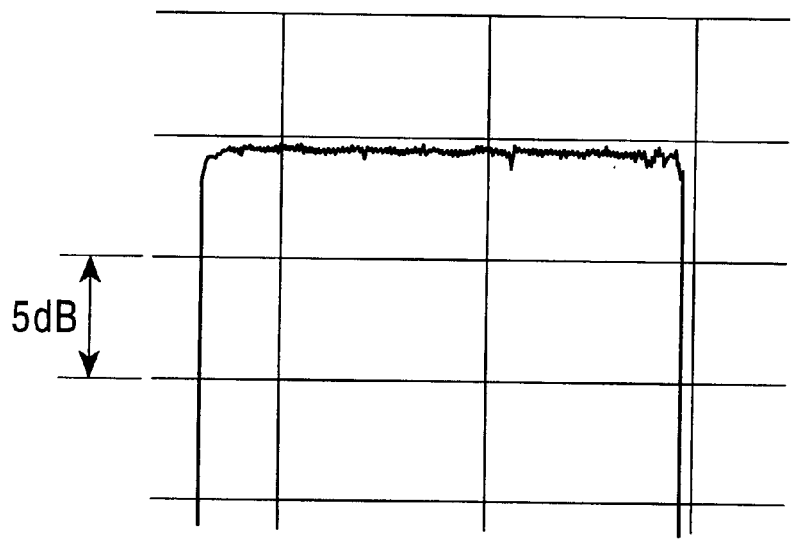
FIG. 8A is an envelope waveform view when recorded data is reproduced in the embodiment and FIG. 8B is an envelope waveform view when the recorded data is reproduced in the comparative example.

FIG. 7A shows a result of observation when a recorded pattern recorded by the embodiment was observed under a magnetic force microscope (MFM), whereas FIG. 7B shows a result of observation when a recorded pattern recorded by the comparative example was observed under the MFM. FIG. 8A is an envelope waveform view when the magnetic data recorded by the embodiment was reproduced, whereas FIG. 8B is an envelope waveform view when the magnetic data recorded by the comparative example was reproduced.

In FIG. 8, the abscissa represents a time and the ordinate represents an envelope output level graduated by 5 dB.

In the comparative example, the recorded pattern is disturbed in the data boundary De as shown in FIG. 7B, whereas in the embodiment, the recorded pattern is not almost disturbed in the data boundary De as shown in FIG. 7A.

Figure 8B:
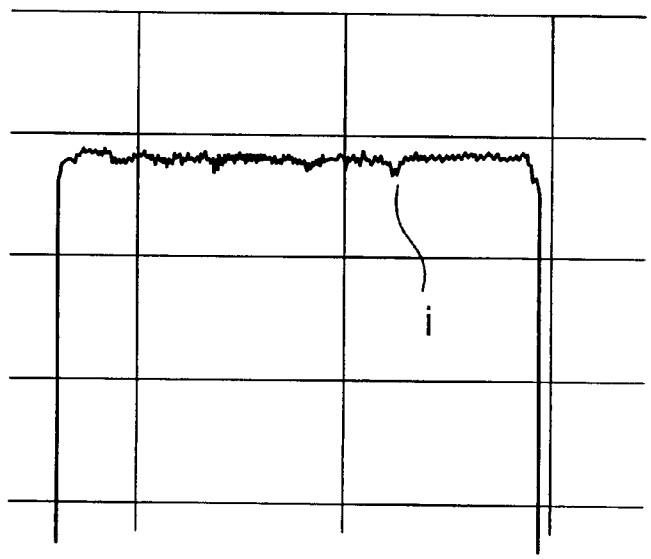

In the comparative example, the variation (i) of a reproduced output of about 1 dB which corresponds to the disturbance of the recorded pattern at the data boundary De is generated to the envelope as shown in FIG. 8B, whereas no extreme variation of a reproduced output is generated in FIG. 8A and the reproduced output is stable.

As described above, according to the present invention, when a data track is formed by overwrite, since the portion which is left as the data track is written with the portion the magnetic head at the center in the width direction thereof which is good touch with a magnetic tape, a recorded pattern is made stable and a reproduced output is not extremely varied.

What is claimed is:

1. A magnetic recording apparatus having a magnetic head for carrying out an overwrite operation so that a magnetic gap having a prescribed track width overlaps a recording track having been recorded on a magnetic recording medium in the track width direction thereof by scanning the magnetic recording medium with the magnetic head to which the magnetic gap is formed at the portion thereof where cores composed of a magnetic material are confronted with each other, wherein the magnetic gap is formed by being offset with respect to the core width in the magnetic head so that the overwrite edge of the magnetic gap is offset to the center of the core width, wherein Tw−Tp=L1−L2 (however, L1>L2) is established, where Tw represents the track width of the magnetic gap, L1 represents the distance between the overwrite edge of the magnetic gap and the side edges of the cores, L2 represents the distance between the edge of the magnetic gap opposite to the overwrite edge and the side edges of the cores, and Tp represents the track pitch of a data track left to the magnetic recording medium by being overwritten, wherein the center CL in the core width direction is located at an approximately mid portion of the data track written at the track pitch.

2. A magnetic recording apparatus having a magnetic head according to claim 1, wherein the sliding surface of the cores to the recording medium is formed to a curved shape so that the center CL in the core width becomes an apex.

3. A magnetic head for carrying out an overwrite operation in a magnetic recording apparatus, the magnetic head comprising:

a first core composed of magnetic material; and
a second core composed of magnetic material, the second core disposed to confront the first core along a confronting portion, the first and second cores forming a sliding surface,
wherein the first and second cores form a magnetic gap along the confronting portion, the magnetic gap having an overwrite edge and a track width on the sliding surface, the track width to overlap a recording track recorded on a magnetic recording medium in the track width direction,
wherein the magnetic gap is offset with respect to a core width of the first and second cores, the overwrite edge being offset to a centerline of the sliding surface,
wherein the first and second cores have first and second side edges, the magnetic gap has an opposing edge opposite to the overwrite edge, and Tw−Tp=L1−L2, where L1>L2, Tw is the track width of the magnetic gap, L1 is the distance between the overwrite edge and the first side edge, L2 is the distance between the opposing edge and the second side edge, and Tp is a track pitch of a data track left on the magnetic recording medium, and wherein the center CL in the core width direction is located at an approximately mid portion of the data track written at the track pitch.

4. A magnetic head according to claim 3, wherein the sliding surface has a curved shape with an apex along the centerline.

* * * * *